(«United States Patent [19]

Evans et al.

[11] 4,361,669
[45] Nov. 30, 1982

[54] COATING COMPOSITIONS COMPRISING A REACTION PRODUCT OF A DISPERSED HYDROXY-ALKYL MODIFIED STARCH PRODUCT AND A HYDROLYZED STYRENE MALEIC ANHYDRIDE COPOLYMER

[75] Inventors: Wilbur G. Evans, Oxford; Myrl A. Nisely, Hamilton; Paul D. Harper, Cincinnati, all of Ohio

[73] Assignee: Champion International Corporation, Stamford, Conn.

[21] Appl. No.: 293,444

[22] Filed: Aug. 17, 1981

[51] Int. Cl.$^3$ ............................................. C08L 35/06
[52] U.S. Cl. ..................................... 524/424; 524/50; 524/501; 524/517; 524/549; 525/54.26
[58] Field of Search ................ 524/50, 424, 501, 517, 524/549; 525/54.26

[56] References Cited
U.S. PATENT DOCUMENTS
3,425,896  2/1969  Hart ..................................... 161/266
4,243,564  1/1981  Mavis ................................... 428/511

*Primary Examiner*—Maurice J. Welsh
*Attorney, Agent, or Firm*—Evelyn M. Sommer

[57] ABSTRACT

An ammonium salt of the reaction product, in an aqueous medium, of a hydrolyzed styrene-maleic anhydride copolymer and a dispersed hydroxy-alkyl modified starch, is used as a component of a binder composition for coating materials. Film-forming coating compositions comprise, as a binder, said reaction product and an elastomeric or resin latex, and further comprise a paper coating pigment, and barium carbonate and ammonium bicarbonate as scavenging agents. Additionally, said compositions may comprise up to about 25%, by weight of the binder, of ammonium zirconyl carbonate.

12 Claims, No Drawings

COATING COMPOSITIONS COMPRISING A REACTION PRODUCT OF A DISPERSED HYDROXY-ALKYL MODIFIED STARCH PRODUCT AND A HYDROLYZED STYRENE MALEIC ANHYDRIDE COPOLYMER

BACKGROUND OF THE INVENTION

This invention relates to the use of reaction products of hydrolyzed styrene-maleic anhydride copolymer and a dispersed hydroxy-alkyl modified starch as a constituent of a binding composition for pigmented coatings. More particularly, it relates to binding compositions comprising said reaction product and an elastomeric or resin latex which may additionally contain up to about 25% by weight of ammonium zirconyl carbonate.

In certain types of coated fine papers the chief types of binders used for paper coatings are casein and soy protein, although styrene-butadiene latices, acrylic latices, polyvinyl alcohol, certain types of starch products, etc., have also been used. However, because of its versatility and the fact that it is easily insolubilized, casein has heretofore been the preferred pigment dispersion medium, particularly for high grade paper coatings. Unfortunately, the high cost and food product applications of casein have limited its use as a paper coating adhesive. As to soy protein binders, the raw material for this product is abundant; however, the availability of a manufactured soy bean isolate is limited.

Efforts to substitute other materials for casein and soy protein have had varying degrees of success. Because of its ready availability and relative cheapness, starch products have in recent years received much attention for possible use in binders for paper coating compositions.

All starches contain two types of molecular structures: an "amylose" fraction which is essentially linear long chain material, and an "amylopectin" fraction which is a highly branched material. Varieties of starch have been developed, i.e., waxy starches, which contain a high percentage of the amylopectin fraction (>90%); these products are referred to as "high amylopectin starches" and are somewhat more expensive than ordinary starch which has a higher amylose content.

U.S. Pat. No. 4,243,564, pertinent portions of which are incorporated herein by reference, describes the use of high amylopectin starches to prepare a reaction product of hydrolyzed styrene maleic anhydride copolymer with a dispersed high amylopectin starch, said product being neutralized with a volatile alkali such as ammonium hydroxide. Coating compositions containing said reaction product as a binder constituent are said to provide satisfactory coating compositions for use in paper coatings and paints. U.S. Pat. No. 4,243,564 teaches that the key to satisfactory coating compositions is the use of a high amylopectin starch, rather than an ordinary starches.

Although considerably cheaper, and more readily available, than casein or soy protein, high amylopectin starches are nevertheless more costly than ordinary starches. Furthermore, it has been found that the use of high amylopectin starches in the manner taught by U.S. Pat. No. 4,243,564, to prepare paper coatings also requires that about 20% (by weight of the entire binder composition) of a cross-linking agent such as ammonium zirconyl carbonate be used. It would be advantageous to be able to use ordinary starches, rather than a high amylopectin starch if satisfactory coatings can be prepared therefrom. Furthermore, it would be desirable also to eliminate, or at least substantially reduce, the amount of cross-linking agent required.

SUMMARY OF THE INVENTION

An ammonium salt of the reaction product, in aqueous medium, of a hydrolyzed styrene maleic anhydride copolymer and a dispersed hydroxy-alkyl modified starch has been found to be suitable for use as a component of a binder in a film-forming coating composition. The present invention includes the reaction product itself and film-forming coating compositions containing the reaction product. A suitable film-forming composition comprises (1) as a binder, the reaction product of an elastomeric or resin latex, (2) a paper coating pigment and (3) barium carbonate and ammonium bicarbonate as scavenging agents. Although not an essential ingredient of the compositions of this invention, the film-forming composition may also contain additionally up to about 25%, preferably about 10 to 20%, by weight of the binder, of ammonium zirconyl carbonate as a cross-linking agent.

DETAILED DISCLOSURE

The reaction product of this invention is formed by reacting an hydroxy-alkyl modified starch with styrene-maleic anhydride copolymer in water, in the presence of ammonium hydroxide.

Starches such as corn, potato and tapioca, have long been used as ahesives in the paper industry. In order to use such starches as adhesives or in coating compositions, they must be dispersed in water. Cooking of such starch suspensions causes degeneration of the starch particles, resulting in improved stability and reduced viscosity but, even when cooked, the starch solutions are still highly viscous and have a marked tendency to congeal, yielding gel-like masses which do not have the flow properties required of a coating composition. In order to provide a starch with the required viscosity and coating characteristics for use in pigment coating of paper, it is necessary to modify the starch somewhat. This modification is generally accomplished by the well known enzyme conversion of common starches, and also by other methods such as hydroxyethylation, ethylation and acetylation of starch.

The starches used in the practice of the present invention are hydroxy-alkyl modified starches, preferably, hydroxy-ethyl modified starches, prepared by reaction with an alkylene oxide, e.g., ethylene oxide, under alkaline conditions. The starches employed in the present invention have amylose contents ranging from about 20% to about 75%, preferably from about 24% to about 27% and an amylopectin content ranging from about 25% to about 80%, preferably, from about 73% to about 76%. These starches will be referred to herein as "hydroxy-alkyl modified starches". Examples of such starches are Amaizo 745-D made by American Maize-Products Company, Penford Gum 280 made by Penick and Ford, Ltd., and Ethylex 2030 made by Staley.

As far as the styrene-maleic anhydride copolymer is concerned, any of the commercially available copolymers can be used. Particularly suitable is SMA 3000, sold by Arco Chemical Company, which is a resin prepared from a 3:1 ratio of styrene to maleic anhydride, having a molecular weight of about 1900 and an acid number of 275. Other styrene-maleic anhydride copolymers which may be used include Lytron 810 by Monsanto Company, which is made from a 1:1 ratio of styrene to maleic anhydride, and has a molecular weight of about 50,000 and an acid number of 320.

The ratio of copolymer to starch can be varied over a wide range depending upon desired effect and/or economics. Suitable products are obtained with ratios of 5 to 45% by weight of copolymer to 95 to 55% by weight of the hydroxy-alkyl modified starch. The preferred range is from 10% to 30% by weight copolymer and from 90 to 70% by weight of starch.

The ammonium hydroxide is used for the purpose of neutralizing the acidic reaction products of the copolymer and starch. It is conveniently used in a 28% aqueous solution. Since the alkali is volatile, it leaves the aqueous composition on drying and thereby adds more water resistance to the resultant dried film. It is believed that, when the copolymer is contacted with the starch, a reaction occurs between the acid groups formed as the copolymer hydrolyzes and the hydroxyl groups of the starch. The remaining acid groups are converted by the ammonium hydroxide to the ammonium salt. The amount of ammonium hydroxide to be used should be sufficient to neutralize all of the acid groups. Preferably, for coating purposes, sufficient ammonium hydroxide should be added to give the reaction product a pH greater than about 8.5.

The reaction product of this invention can be prepared for example, by the methods generally taught in U.S. Pat. No. 4,243,564 using, of course, hydroxy-alkyl modified starch rather than the high amylopectin starches there disclosed. Thus, an aqueous mixture of about 30% total styrene maleic anhydride copolymer and hydroxy-alkyl modified starch is heated at an elevated temperature for a time sufficient to ensure that the starch is completely dispersed, the copolymer is hydrolyzed and the reaction between the two is substantially completed. The temperatures can range from ambient temperatures up to about 200° F., with 150° to 175° F. being preferred. At the preferred temperature, the reaction will be completed in from 25 to 45 minutes. When the reaction is completed, ammonium hydroxide is added with further mixing and heating at the same temperature for another 10 to 15 minutes until such time as a homogeneous mixture is formed. The reaction product prepared by this method or the other methods disclosed herein can be employed in amounts of from about 5 to 15 parts by weight of the coating composition as a constituent of the binder portion of the film-forming coating compositions of this invention.

Alternatively, when the reaction product of this invention is to be used in pigmented paper coatings, it is also possible to prepare the reaction product in situ. Thus, the pigments and scavengers (the use of which will be discussed below) are slurried together, followed by the addition of cooked hydroxy-alkyl modified starch. This mixture is then heated to a temperature of between about 150° and 200° F., and the styrene maleic anhydride copolymer and ammonium hydroxide added. Additional ammonium hydroxide is added to maintain the desired high pH. After about 20 minutes mixing, the remainder of the ingredients (elastomeric or resin latex, etc.) are added.

A third method for reaction product preparation is effected by the addition of styrene maleic anhydride copolymer and ammonia to a cooked hydroxy alkyl modified starch solution and reacting the admixture at elevated temperatures (150°–200° F.) for about 20 minutes, (as per polymers E, F and G described hereinafter in Example 6).

One of the major drawbacks to the use of starch adhesives in binders for paper coating compositions has been the lack of resistance to water. A dried, pigmented starch coating tends, on remoistening, to soften and lose its integrity so that the coated surface can deteriorate during a subsequent printing process. In order to improve the situation, various methods have been developed to increase the insolubilization (or "wet-rub resistance") of starch adhesives. One of the ways of insolubilizing starch adhesives is to add a cross-linking agent, a particularly suitable cross-linking agent being ammonium zirconyl carbonate. The use of ammonium zirconyl carbonate to insolubilize starches is disclosed in U.S. Pat. No. 3,425,896, pertinent portions of which are incorporated herein by reference. It has been found that, when employing the high amylopectin starch-containing compositions described in U.S. Pat. No. 4,243,564, it is necessary to use about 20% by weight (based on the weight of the total binder component) of ammonium zirconyl carbonate as a cross-linking agent. In the binder components of our composition, however, the amount of ammonium zirconyl carbonate can be reduced or eliminated entirely, without suffering any substantial degradation in wet rub resistance.

The other essential ingredient of the binder component of our claimed film-forming coating compositions is from about 5 to 10 parts by weight of an elastomeric or resin latex, whose use for these purposes is well known in the art. SBR latices are particularly useful.

It has been found that the presence of barium carbonate and or ammonium bicarbonate as scavenging agents is advantageous but not required in our film-forming coating compositions. These substances can be used in amounts ranging from about 0 to about 2.0 parts by weight and 0 to about 0.5 parts by weight, respectively, based on total pigment.

The film-forming coating compositions also contain from about 85 to 100 parts by weight of a conventional paper coating pigment such as calcium carbonate, titanium dioxide, kaolin clays and the like.

The invention will be further described in the following examples, which are included here for the purposes of illustration only and are not be construed as limitations.

EXAMPLE 1

Polymers of hydrolyzed styrene-maleic anhydride and starch were prepared according to the following process: Three or six parts of starch and one part SMA 3000 (styrene-maleic anhydride copolymer sold by Arco Chemical Company, having a ratio of styrene or maleic anhydride of 3:1, a molecular weight of 1900 and an acid number of 275) were added to and heated in water for 45 minutes at a temperature of 160° F. with stirring. Then 0.88 parts of 28% ammonium hydroxide (per part of SMA) was added with mixing for an additional 20 minutes and the final pH was adjusted to 9.5 with additional ammonium hydroxide resulting in binders having about a 25% solids content. Four polymers prepared by this process are shown in Table I.

TABLE I

| | Polymer | | | |
| --- | --- | --- | --- | --- |
| | A | B | C | D |
| WATER | 400 | 350 | 350 | 400 |
| STARCH | 100[(1)] | 100[(1)] | 100[(2)] | 100[(2)] |

TABLE I-continued

| | Polymer | | | |
|---|---|---|---|---|
| | A | B | C | D |
| SMA 3000 | 33⅓ | 16⅔ | 16⅔ | 33⅓ |
| NH₄OH (28% aqueous solution) | 30 | 15 | 15 | 30 |

(1)Amaizo 835—high amylopectin starch
(2)Amaizo 745-D—hydroxyethyl modified starch Amaizo starches are manufactured by American Maize-Products Company. The polymers prepared in this example were used in the following examples. It should be noted that polymers A and B are covered by U.S. Pat. No. 4,243,564, while polymers C and D are included in the instant invention.

EXAMPLE 2

Six film-forming coating compositions containing binder and pigment were formulated in the following manner (coating compositions are based on dry parts of raw materials; actual weights of materials are adjusted for water content): 85 parts of ER Calcote (a proprietary precipitated calcium carbonate), 15 parts of KCS Clay, barium carbonate (where indicated) and ammonium bicarbonate (where indicated) were pugged in a Bramley mixer at 76% solids for 30 minutes. Subsequently, 0.25 parts of Dispex N-40, 6 parts of the indicated latex and an additional 0.25 parts of Dispex N-40 were added and mixed for about 5 minutes. Then 9 parts of a polymer prepared according to Example 1, two additional parts of latex, 0.5 parts of oleic acid and ammonium zirconyl carbonate (where indicated) were added and mixed for an additional 5 minutes. The coatings had the compositions shown in Table II.

TABLE II

| COATING NO. | LATEX | POLYMER | BaCO₃ parts | NH₄HCO₃ parts | Ammonium zirconyl carbonate parts |
|---|---|---|---|---|---|
| 1 | Reichhold 68-410 | A | 0 | 0 | 0 |
| 2 | Reichhold 68-410 | B | 0 | 0 | 0 |
| 3 | Dow 620 | B | 1.5 | 0.3 | 20 |
| 4 | Dow 620 | C | 1.5 | 0.3 | 0 |
| 5 | Dow 620 | C | 1.5 | 0.3 | 10 |
| 6 | Dow 620 | C | 1.5 | 0.3 | 20 |

All coatings were homogenized and the pH was adjusted to a minimum of 9.30. Solids were checked and Brookfield and Hercules rheologies were taken at 58% solids content. Sheets of suitable casting paper stock were precoated on a Champflex coater with individual coatings and then cast coated to a total coat weight of 11±1 lbs. per ream. Sheets were tested for wet rub, IGT strength, ink holdout, and optical properties according to standard methods. Table III summarizes the content and data for these six coatings.

TABLE III

| | KK Litho(3) Standard | 1 | 2 | 3 | 4 | 5 | 6 |
|---|---|---|---|---|---|---|---|
| Precipitated CaCO₃ | | 85 | 85 | 85 | 85 | 85 | 85 |
| Scavengers | | No | No | Yes | Yes | Yes | Yes |
| Polymer A | | 11 | | | | | |
| Polymer B | | | 11 | 11 | | | |
| Polymer C | | | | | 11 | 11 | 11 |
| Dow 620 | | | | 8 | 8 | 8 | 8 |
| Reichhold 68-410 | | 8 | 8 | | | | |
| Bacote 20 (% on binder) | | | | 20 | 0 | 10 | 20 |
| pH | | 9.78 | 9.78 | 9.30 | 9.51 | — | — |
| Solids (%) | | 63.1 | 62.7 | 64.0 | 61.5 | — | — |
| Brookfields at 58% TS, 10 | | 23,500 | 18,500 | 10,600 | 5,000 | 6,100 | 7,100 |
| 23° C., #6 Spindle  20 | | 13,500 | 11,100 | 6,750 | 3,000 | 3,900 | 4,600 |
| 50 | | 6,400 | 5,500 | 3,720 | 1,780 | 2,140 | 2,500 |
| 100 | | 3,730 | 3,350 | 2,370 | 1,190 | 1,420 | 1,700 |
| Wet Rub (24 hour) | 97.0 | 2.0 | 3.0 | 83.5 | 33.0 | 82.8 | 93.8 |
| IGT | 138 | — | — | — | 105 | 96 | 103 |
| Brown Ink Smear (— = more absorbent) | 0 | −1 | −1 | 0 | −½ | −1 | −½ |
| Gloss | 83.3 | 76.8 | 77.5 | 84.1 | 82.9 | 81.0 | 82.1 |
| Brightness | 78.2 | 84.0 | 83.4 | 83.1 | 81.8 | 81.6 | 81.4 |
| Opacity | 86.1 | 88.5 | 87.3 | 89.6 | 86.8 | 87.1 | 87.2 |

(3)Krome Kote mill-produced cast paper

These data show that, with the use of high amylopectin starch binders (polymer B) the presence of scavengers and the cross-linking agent ammonium zirconyl carbonate appears to be necessary in order to obtain satisfactory wet rub strength. A comparison of coating No. 3 with coatings No. 5 and 6 show that the use of an hydroxy-ethylated amylose starch in place of the high amylopectin starch yields coatings whose wet strength properties are at least as good or even better. It should be noted further that it is possible to reduce the amount of ammonium zirconyl carbonate to 10 parts with an hydroxy-ethylated amylose starch and still achieve results comparable to the use of 20 parts of the cross-linking agent with a high amylopectin starch.

EXAMPLE 3

A series of four coatings was prepared in the following manner: 85 parts of ER Calcote, 15 parts of KCS clay, 1.5 parts of barium carbonate and 0.3 parts of ammonium bicarbonate were pugged for 30 minutes in a Bramley mixer at 76% solids. Then 1.0 part of Dispex N-40 mixed with 7.3 parts of water were added and mixed for another 5 minutes. Then 6 parts of Dow 620 SBR, 1.0 part of Pentalyn 856, 1 part oleic acid and 9 parts of a polymer prepared according to the method of Example 1 were added and mixed for a further 5 minutes. The four coatings, identical except for the polymer, are shown in Table IV.

TABLE IV

| Coating No. | Polymer |
|---|---|
| 7 | A |
| 8 | A |
| 9 | B |
| 10 | C |

Coatings 7, 8 and 10 were satisfactory. Further work on coating No. 9 had to be abandoned because of large aggolomerates of undispersed pigment.

The coatings were applied to paper stock according to the method of Example 2 and were tested in the same manner. The results are shown in Table V.

TABLE V

|  | KK Litho Standard | 7 | 8 | 10 |
|---|---|---|---|---|
| ER Calcote |  | 85 | 85 | 85 |
| Scavengers |  | Yes | Yes | Yes |
| Polymer A |  | 9 | 9 |  |
| Polymer C |  |  |  | 9 |
| Dow 620 |  | 6 | 6 | 6 |
| pH |  | 9.51 | 9.33 | 9.76 |
| Percent Solids |  | 61.2 | 61.4 | 59.1 |
| Brookfields at 58% TS, 10 |  | 6,700 | 6,200 | 12,500 |
| 23° C., #6 Spindle    20 |  | 4,250 | 3,900 | 7,500 |
| 50 |  | 2,260 | 2,080 | 3,860 |
| 100 |  | 1,500 | 1,330 | 2,410 |
| Wet Rub (24 hour) | 97.0 | 80.5 | 91.3 | 88.0 |
| IGT | 138 | 95 | 90 | 66 |
| Brown Ink Smear | 0 | −½ | −1 | −1½ |
| (− = more absorbent) |  |  |  |  |
| Gloss | 83.3 | 85.7 | 84.6 | 82.9 |
| Brightness | 78.2 | 82.5 | 87.7 | 81.1 |
| Opacity | 86.1 | 88.1 | 82.8 | 88.3 |

These data further demonstrate that water resistance comparable to coatings using the high amylopectin starch in a 3:1 ratio of starch: SMA is obtained using the more economical hydroxy-ethyl-modified starch in a lower 6:1 starch: SMA ratio.

EXAMPLE 4

85 parts of ER Calcote pigment with 1.5% Dispex N40 was slurried in a Kady mill for 45 minutes at 71.5% solids content. The slurried mixture was then placed in a mini-Cowles mixer, along with 15 parts of KCS clay, 0.1 part of TSPP, barium carbonate (where indicated), ammonium bicarbonate (where indicated), 11 parts of a polymer according to EXAMPLE 1, 8 parts of the indicated latex, a cross-linking agent (where indicated), 0.5 parts of CL-20 and 0.5 parts of oleic acid, and all of this was mixed for about 5 minutes. A number of coatings were prepared, the content of which is shown in the following Table VI.

TABLE VI

| Coating No. | BaCO$_3$ parts | NH$_4$HCO$_3$ parts | Latex | Polymer | Crosslinker parts |
|---|---|---|---|---|---|
| 11 | 0 | 0 | Reichhold 68-410 | A | — |
| 12 | 0 | 0 | Reichhold 68-410 | A | 20% Bacote 20 |
| 13 | 0 | 0 | Reichhold 68-410 | A | 10% Parez 707 |
| 14 | 0 | 0 | Reichhold 68-410 | B | — |
| 15 | 0 | 0 | Dow 620 | B | 20% Bacote 20 |
| 16 | 1.5 | 0.3 | Dow 620 | C | — |
| 17 | 0 | 0 | Dow 620 | C | — |
| 18 | 1.5 | 0.3 | Dow 620 | C | 20% Bacote 20 |
| 19 | 1.5 | 0.3 | Dow 620 | B | — |
| 20 | 1.5 | 0.3 | Dow 620 | C | — |
| 21 | 1.5 | 0.3 | Dow 620 | D | — |
| 22 | 1.5 | 0.3 | Reichhold 68-410 | C | — |
| 23 | 1.5 | 0.3 | Dow XD 30413.00 | C | — |
| 24 | 1.5 | 0.3 | Arco SKD 1138 | C | — |
| 25 | 1.5 | 0.3 | Reichhold 40-456 | C | — |
| 26* | 1.5 | 0.3 | Dow 620 | C | — |

*Coating No. 26 was prepared using, in place of 85 parts ER Calcote, 23 parts of Mississippi M-60 and 62 parts of ER Calcote. The ER Calcote was added to a slurry of the M-60 (58% total solids), the KCS clay (70% total solids) and the indicated scavengers and mixed for 30 minutes; the total solids content at this point was 71.5%. The remainder of the indicated ingredients were then added.

The coatings were applied to paper stock and tested in the manner described for Example 2. These test results are shown in the following Table VII.

TABLE VII

|  | KK Litho Standard | 11 | 12[1] | 13[1] | 14 | 15 | 19 | 17 |
|---|---|---|---|---|---|---|---|---|
| ER Calcote |  | 85 | 85 | 85 | 85 | 85 | 85 | 85 |
| M-60 |  |  |  |  |  |  |  |  |
| Scavenger (BaCO$_3$, NH$_4$HCO$_3$) |  |  |  |  |  |  | X |  |
| Polymer A |  | 11 | 11 | 11 |  |  |  |  |
| Polymer B |  |  |  |  | 11 | 11 | 11 |  |
| Polymer C |  |  |  |  |  |  |  |  |
| Polymer D |  |  |  |  |  |  |  | 11 |
| Dow 620 |  |  |  |  |  | 8 | 8 | 8 |
| Reichhold 68-410 |  | 8 | 8 | 8 | 8 |  |  |  |
| Dow XD 30413.00 |  |  |  |  |  |  |  |  |
| Arco SKD 1138 |  |  |  |  |  |  |  |  |
| Reichhold 40-456 |  |  |  |  |  | 20 |  |  |
| Bacote 20 (% on binder) |  |  | 20 |  |  |  |  |  |
| Parez 707 (% on binder) |  |  |  | 10 |  |  |  |  |
| pH |  | 9.70 | — | — | 10.07 | 9.35 | 9.80 | 10.36 |
| Solids (%) |  | 59.9 | — | — | 60.3 | 58.5 | 59.3 | 59.7 |
| Brookfields at 58%  10 |  | 31,300 | — | — | 17,400 | Too | 11,300 | 11,300 |
| TS, 23° C., #6       20 |  | 18,950 | — | — | 11,250 | High | 7,150 | 6,900 |
| Spindle              50 |  | 9,380 | — | — | 5,880 | To | 3,980 | 3,600 |
| 100 |  | 5,460 | — | — | 3,640 | Measure | 2,570 | 2,250 |
| Wet Rub (24 hour) | 97.0 | 9.1 | 87.5 | 5.9 | 6.3 | 89.5 | 50.0 | 49.5 |
| IGT | 138 | — | — | — | — | — | 144 | 125 |
| Brown Ink Smear | 0 | 0 | — | — | 0 | — | +½ | 0 |

TABLE VII-continued

| (— = more absorbent) | | | | | | | | | |
|---|---|---|---|---|---|---|---|---|---|
| Gloss | 83.3 | 81.6 | — | — | 79.8 | Not | 83.1 | 83.2 |
| Brightness | 78.2 | 83.3 | — | — | 83.2 | Tested | 87.8 | 88.1 |
| Opacity | 86.1 | 88.6 | — | — | 88.0 | | 81.7 | 82.1 |

| | KK Litho Standard | 16 | 18 | 20 | 21 | 22 | 23 | 24 | 25 | 26 |
|---|---|---|---|---|---|---|---|---|---|---|
| ER Calcote | | 85 | 85 | 85 | 85 | 85 | 85 | 85 | 85 | 62 |
| M-60 | | | | | | | | | | 23 |
| Scavenger (BaCO3, NH4HCO3) | | X | X | X | X | X | X | X | X | X |
| Polymer A | | | | | | | | | | |
| Polymer B | | | | | | | | | | |
| Polymer C | | 11 | 11 | 11 | | 11 | 11 | 11 | 11 | 11 |
| Polymer D | | | | | 11 | | | | | |
| Dow 620 | | 8 | 8 | 8 | 8 | | | | | 8 |
| Reichhold 68-410 | | | | | | 8 | | | | |
| Dow XD 30413.00 | | | | | | | 8 | | | |
| Arco SKD 1138 | | | | | | | | 8 | | |
| Reichhold 40-456 | | | | | | | | | 8 | |
| Bacote 20 (% on binder) | | | | 20 | | | | | | |
| Parez 707 (% on binder) | | | | | | | | | | |
| pH | | 9.85 | 9.40 | 9.78 | 9.88 | 9.77 | 9.88 | 9.52 | 9.83 | 9.88 |
| Solids (%) | | 59.5 | 58.5 | 59.4 | 59.5 | 59.5 | 59.3 | 59.5 | 59.2 | 58.0 |
| Brookfields at 58% 10 | | 9,100 | 16,000 | 13,000 | 11.500 | 14,000 | 9,200 | 33,700 | 10,100 | 14,400 |
| TS, 23° C., #6  20 | | 5,700 | 10,100 | 7,700 | 7,400 | 8,400 | 5,500 | 18,850 | 5,850 | 8,500 |
| Spindle  50 | | 3,060 | 5,240 | 4,000 | 3,800 | 4,140 | 2,880 | 8,840 | 3,080 | 4,240 |
| 100 | | 1,970 | 3,270 | 2,550 | 2,420 | 2,520 | 1,770 | 5,100 | 1,930 | 2,560 |
| Wet Rub (24 hour) | 97.0 | 85.0 | 97.2 | 78.3 | 90.9 | 63.2 | 72.3 | 85.0 | 68.2 | 79.0 |
| IGT | 138 | 123 | 127 | 154 | 133 | 163 | 160 | 161 | 154 | 160 |
| Brown Ink Smear (— = more adsorbent) | 0 | 0 | −½ | −½ | −½ | −½ | −½ | 0 | −1 | +1 |
| Gloss | 83.3 | 83.0 | 77.6 | 79.4 | 80.7 | 81.2 | 81.0 | 83.9 | 83.0 | 76.2 |
| Brightness | 78.2 | 88.3 | 88.6 | 81.8 | 83.5 | 83.5 | 82.5 | 82.7 | 83.8 | 82.6 |
| Opacity | 86.1 | 82.5 | 83.3 | 87.0 | 87.3 | 88.2 | 87.4 | 86.7 | 88.1 | 85.1 |

[1]Crosslinkers post added and tested for wet rub only.

These data establish several points, first, with respect to the need for scavengers: Coatings 14 and 19 without and with scavengers, respectively, demonstrate the improvement in water resistance due to addition of scavengers in high amylopectin starch coatings. Coatings 17 and 16, without and with scavengers, respectively, show the same type of improvement in hydroxyethylated starch coatings.

With regard to the waterproofing ability of the hydroxyethylated starch versus the high amylopectin starch (Coatings 16 and 19, respectively, both with scavengers), it can be seen that the hydroxyethylated starch provides better water resistance than the high amylopectin starch in the same formula. Use of 20% ammonium zirconyl carbonate crosslinker with the high amylopectin starch (Coating 15) is necessary to achieve water resistance comparable to that of Coating 16.

Coatings 20 and 22–25 demonstrate the ability of hydroxyethylated starch to perform satisfactorily with a variety of latexes, all without need for the ammonium zirconyl carbonate crosslinker. Coating 21 is an example of the properties obtained using polymer D. Coating 26 demonstrates that the hydroxyethylated starch produces acceptable water resistance using a different pigment combination.

EXAMPLE 5

This example shows an in situ method of preparing the binder components of this invention. A pigment slurry containing 85 parts of ER Calcote and 1.5% Dispex N-40 was prepared according to the method described in Example 4. This pigment slurry, 15 parts KCS clay, 0.1 part TSPP, 1.5 parts of barium carbonate and 0.3 parts of ammonium carbonate were slurried together. There was then added 9.5 parts of Amaizo 745-D starch (an ethylated amylose starch) and the mixture was heated to the temperature specified below. This was followed by addition of 1.5 parts of SMA 3000, 0.88 parts of 28% ammonium hydroxide (per part of SMA), 8 parts of DOW 620, 0.5 parts of CL-20 and 0.5 parts oleic acid. The mixture was mixed for 20 minutes, with the addition of sufficient additional ammonium hydroxide to keep the pH at the level indicated below. By this method, polymer C was prepared in situ at a temperature and pH levels shown in Table VIII.

TABLE VIII

| Coating No. | Temperature of SMA Addition | pH |
|---|---|---|
| 27 | 150 | 9.26 |
| 28 | 100 | 9.90 |
| 29 | 150 | 9.50 |

The coatings prepared in this manner were tested according to the method described in Example 2, with the results shown in the following Table IX.

TABLE IX

| | KK LITHO Standard | 27 | 28 | 29 |
|---|---|---|---|---|
| Temp. at SMA Addition (°F.) | | 150 | 100 | 150 |
| pH at SMA Addition | | — | — | 9.80 |
| Scavengers | | Yes | Yes | Yes |
| Amaizo 745-D ⎫ | | 9.4 | 9.4 | 9.4 |
| SMA 3000  ⎬ Polymer C | | 1.6 | 1.6 | 1.6 |
| Dow 620 ⎭ | | 8 | 8 | 8 |
| pH | | 9.26 | 9.90 | 9.50 |
| Solids (%) | | 68.0 | 65.5 | 68.1 |

TABLE IX-continued

|  | KK LITHO Standard | 27 | 28 | 29 |
|---|---|---|---|---|
| Brookfields at 58% TS, 10 |  | 6,500 | 8,500 | 9,200 |
| 23° C., #6 Spindle    20 |  | 4,000 | 5,450 | 5,800 |
| 50 |  | 2,200 | 3,000 | 3,120 |
| 100 |  | 1,460 | 1,940 | 2,020 |
| Wet Rub (24 hour) | 97.0 | 24.0 | 33.2 | 86.1 |
| IGT | 138 | 136 | 138 | 153 |
| Brown Ink Smear (+ = Harder) | 0 | 0 | 0 | +1 |
| Gloss | 83.3 | 80.9 | 80.7 | 83.7 |
| Brightness | 78.2 | 82.1 | 82.8 | 83.2 |
| Opacity | 86.1 | 88.3 | 88.9 | 88.0 |

EXAMPLE 6

Three reaction products, referred to as "polymer E", "polymer F" and "polymer G" were prepared according to the following procedure: Amaizo 745-D starch, in the amount indicated, was cooked for 25 minutes at 190° F. There was then added one part of SMA 3000, 0.9 parts of 28% ammonium hydroxide (per part of SMA) and sufficient water to provide for a 26% solids content. The mixture was cooked for 20 minutes at 160° F. The polymer reaction products had the amounts of starch shown in Table X.

TABLE X

| Polymer | Parts of Starch per part of SMA |
|---|---|
| E | 6 |
| F | 4.5 |
| G | 3 |

Pigment slurries were prepared having the following content: 25 parts of Mississippi M-60 slurry, 15 parts KCS clay, 60 parts ER Calcote, 1.5 parts barium carbonate, 0.3 parts ammonium bicarbonate, 1.5 parts Dispex N-40. The ER Calcote pigment came from two sources, and "old" source prepared 9 months previous with a specific surface of approximately 35,000 cm²/gm and a "new" source freshly prepared with a specific surface of approximately 39,000 cm²/gm.

A coating preparation was prepared having the following ingredients: 100 parts of pigment slurry, a polymer prepared according to this Example, DOW 620, CL-20, oleic acid and Bacote 20 ammonium zirconyl carbonate (where indicated). The coatings prepared had the components shown in Table XI.

TABLE XI

| Coating No. | ER Calcote Component | Polymer | Dow 620 parts | CL-20 parts | Oleic Acid parts | Bacote 20 % on binder |
|---|---|---|---|---|---|---|
| 30 | old | 11 parts E | 8 | 0.5 | 0.75 | 0 |
| 31 | old | 11 parts E | 8 | 0.5 | 0.75 | 10 |
| 32 | old | 11 parts F | 8 | 0.5 | 0.75 | 0 |
| 33 | old | 11 parts G | 8 | 0.5 | 0.75 | 0 |
| 34 | new | 10 parts E | 7 | 0.5 | 0.75 | 0 |
| 35 | new | 10 parts E | 7 | 1.0 | 1.25 | 0 |
| 36 | new | 11 parts F | 8 | 0.5 | 0.75 | 0 |
| 37 | new | 11 parts G | 8 | 0.5 | 0.75 | 0 |
| 38 | new | 11 parts E | 8 | 0.5 | 0.75 | 0 |
| 39 | new | 11 parts E | 8 | 0.5 | 0.75 | 0 |

The coatings were tested on paper stock according to the procedure described in Example 2. The results are summarized in the following Table XII.

TABLE XII

|  | 30 | 31 | 32 | 33 | 34 | 35 | 36 | 37 | 38 | 39 | Mill Loop |
|---|---|---|---|---|---|---|---|---|---|---|---|
| KCS Clay | 15 | 15 | 15 | 15 | 15 | 15 | 15 | 15 | 15 | 15 | — |
| M-60 Carbonate | 25 | 25 | 25 | 25 | 25 | 25 | 25 | 25 | 25 | 25 | — |
| ER Calcote (7/23/80) | 60 | 60 | 60 | 60 |  |  |  |  |  |  |  |
| ER Calcote (1/21/81) |  |  |  |  | 60 | 60 | 60 | 60 | 60 | 60 |  |
| Polymer E | 11 | 11 |  |  | 10 | 10 |  | 11 | 11 |  |  |
| Polymer F |  |  | 11 |  |  |  | 11 |  |  | 11 |  |
| Polymer G |  |  |  | 11 |  |  |  | 11 |  |  |  |
| Dow 620 Latex | 8 | 8 | 8 | 8 | 7 | 7 | 8 | 8 | 8 | 8 |  |
| CL-20 | 0.5 | 0.5 | 0.5 | 0.5 | 0.5 | 1.0 | 0.5 | 0.5 | 0.5 | 0.0 |  |
| Oleic Acid | 0.75 | 0.75 | 0.75 | 0.75 | 0.75 | 1.25 | 0.75 | 0.75 | 0.75 | .75 |  |
| Bacote | — | 10% | — | — | — | — | — | — | — | — |  |
| Solids (%) | 59.6 | 59.6 | 59.9 | 60.6 | 59.2 | 59.2 | 59.1 | 59.9 | 59.7 |  |  |
| pH | 9.62 | 9.62 | 9.55 | 9.50 | 9.45 | 9.45 | 9.51 | 9.60 | 9.50 | 9.48 |  |
| Brookfield at 58%    10 | 8,700 | 8,700 | 7,200 | 6,200 | 8,400 | 8,400 | 10,000 | 9,300 | 9,300 |  |  |
| #6 Sp., 23° C.    20 | 5,450 | 5,450 | 4,550 | 3,850 | 5,100 | 5,100 | 6,250 | 5,600 | 5,700 |  |  |
| 50 | 2,940 | 2,940 | 2,480 | 2,140 | 2,720 | 2,720 | 3,240 | 3,020 | 3,040 |  |  |
| 100 | 1,870 | 1,870 | 1,590 | 1,360 | 1,760 | 1,760 | 2,030 | 1,900 | 1,920 |  |  |
| Gloss | 84.9 | 81.4 | 85.0 | 84.2 | 84.3 | 84.1 | 85.2 | 83.5 | 83.9 | 83.9 | 87.0 |
| Brightness | 81.2 | 82.7 | 81.7 | 82.6 | 80.7 | 80.0 | 80.6 | 80.8 | 80.2 | 80.7 | 77.4 |
| Opacity | 88.1 | 89.1 | 88.2 | 88.8 | 87.5 | 87.1 | 87.7 | 87.8 | 87.3 | 88.6 | 87.2 |
| Wet Rub - 24 hour | 50.0 | 96.0 | 89.0 | 84.5 | 74.0 | 69.5 | 86.5 | 93.5 | 89.0 | 94.0 | 99.0 |
| Brown Ink Smear | −1 | 0 | 0 | 0 | 0 | −½ | +½ | +½ | 0 | 0 | 0 |
| Brown Ink Attack | −1 | −½ | −½ | 0 | 0 | 0 | 0 | 0 | 0 | 0 | 0 |

These data demonstrate that coatings of quality comparable to standard mill production cast coatings can be made from binders prepared as described for polymers E, F and G, and further, that it is possible to produce such coatings using reaction products of varying hydroxyethylated starch: SMA ratios.

The listing below identifies the manufacturers of the various materials identified by their trademarks or trade names herein:

| Item | Chemical content | Source | Function |
|---|---|---|---|
| ER Calcote | CaCO₃ | Hamilton Mill | Pigment |
| KCS Clay | Kaolinite | Georgia Kaolin | Pigment |
| Dispex N-40 | Polyacrylate | Allied Colloid | Dispersant |
| CL-20 | Polyethylene Emulsion | Berchem, Inc. | Release Agent |
| Oleic Acid | Fatty Acid | Emery Industries | Release Agent |
| Bacote 20 | Ammonium Zirconium | Magnesium Electron, Inc. | Binder Insolubilizer |

-continued

| Item | Chemical content | Source | Function |
|---|---|---|---|
| Reichhold 68-401 | SBR Latex Carbonate | Reichhold Chem. Co. | Binder |
| Dow 620 | SBR Latex | Dow Chemical Co. | Binder |
| Dow XD-30413 | Experimental SBR Latex | Dow Chemical Co. | Binder |
| Dylex SKD1138 | Carboxylated SBR Latex | Polysar Industries | Binder |
| Reichhold 40-456 | SBR Latex | Reichhold Chem. Co. | Binder |
| Pentalyn 856 | Penterythritol Ester of Rosin Acids | Hercules, Inc. | Gloss Enhancer |
| Mississippi M-60 | $CaCO_3$ | Miss. Lime Co. | Pigment |
| TSPP | Tetrasodium Pyrophosphate | Monsanto | Clay Dispersant |
| Parez 707 | Melamine Formaldehyde | American Cyanamid | Binder Insolubilizer |

We claim:

1. An ammonium salt of a reaction product, in an aqueous medium, of a hydrolyzed styrene-maleic anhydride copolymer and a dispersed hydroxy-alkyl-modified starch.

2. A reaction product according to claim 1 in which the copolymer has a 3:1 ratio of styrene to maleic anhydride, a molecular weight of about 1900 and an acid number of about 275.

3. A reaction product according to claim 1 in which the copolymer is present in amounts ranging from about 5% to about 45% and the starch is present in amounts ranging from about 95% to about 55%.

4. A reaction product according to claim 3 in which the copolymer ranges from about 10% to 30% and the starch ranges from 90% to about 70%.

5. A reaction product according to claim 1 wherein sufficient ammonium hydroxide is added to impart a pH greater than 8.5 to the reaction product.

6. A reaction product according to claim 1 wherein the dispersed starch is a hydroxyethyl-modified starch.

7. A reaction product according to claim 6 wherein the hydroxyethyl-modified-starch has an amylose content ranging from 20 to 32% by weight.

8. A film forming coating composition comprising the reaction product of claim 1.

9. A coating composition comprising (1) as a binder, from about 5 to 15 parts of the reaction product according to claim 1, in an aqueous medium and from about 5 to 10 parts of an elastomeric or resin latex, (2) from about 80 to 100 parts of a paper coating pigment, (3) as scavengers, 0 to 2 parts based on the amount of pigment of barium carbonate and 0 to 0.5 parts based on the amount of pigment of ammonium bicarbonate.

10. A composition according to claim 9 which additionally comprises, in binder (1) up to about 25% based on the amount of binder, of ammonium zirconyl carbonate.

11. A composition according to claim 10 in which the ammonium zirconyl carbonate is present in an amount from about 10 to about 20 weight percent of the binder.

12. An ammonium salt of the reaction product of a hydrolyzed styrene-maleic anhydride copolymer and a dispersed hydroxyalkyl modified starch.

* * * * *